(12) United States Patent
Yliuntinen et al.

(10) Patent No.: US 11,576,185 B2
(45) Date of Patent: Feb. 7, 2023

(54) RADIO DOWNLINK INFORMATION

(71) Applicant: Nordic Semiconductor ASA, Trondheim (NO)

(72) Inventors: Pasi Yliuntinen, Trondheim (NO); Mauri Nissilä, Trondheim (NO); Hanna-Liisa Tiri, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 124 days.

(21) Appl. No.: 17/255,868

(22) PCT Filed: Jun. 20, 2019

(86) PCT No.: PCT/EP2019/066366
§ 371 (c)(1),
(2) Date: Dec. 23, 2020

(87) PCT Pub. No.: WO2020/002129
PCT Pub. Date: Jan. 2, 2020

(65) Prior Publication Data
US 2021/0266910 A1 Aug. 26, 2021

(30) Foreign Application Priority Data
Jun. 29, 2018 (GB) ..................... 1810771

(51) Int. Cl.
*H04W 72/04* (2009.01)
*H04L 1/00* (2006.01)
*H04W 72/0446* (2023.01)

(52) U.S. Cl.
CPC ....... *H04W 72/0493* (2013.01); *H04L 1/0061* (2013.01); *H04W 72/042* (2013.01); *H04W 72/0446* (2013.01)

(58) Field of Classification Search
CPC .......... H04W 72/0493; H04W 72/042; H04W 72/0446; H04L 1/0061
See application file for complete search history.

(56) References Cited

U.S. PATENT DOCUMENTS

2016/0330633 A1* 11/2016 You ..................... H04W 4/70
2017/0094643 A1   3/2017 Park et al.
(Continued)

FOREIGN PATENT DOCUMENTS

| WO | WO 2017/029066 A1 | 2/2017 |
| WO | WO 2017/023370 A1 | 9/2017 |
| WO | WO 2018/108057 A1 | 6/2018 |

OTHER PUBLICATIONS

Huawei et al: "Remaining details of M-PDCCH repetition for MTC", 3GPP Draft; R1-155112, 3rd Generation Partnership Project (3GPP), Mobile Competence Centre ; 650, Route Des Lucioles ; F-06921 Sophta-Antipolis Cedex ; France, vol. RAN WG1, No. Malmo, Sweden; Oct. 5, 2015-Oct. 9, 2015 Oct. 4, 2015 (Oct. 4, 2015), Retrieved from the Internet: URL:http://www.3gpp.org/ftp/Meetings_3GPP_SYNC/RAN1/Docs/ [retrieved on Oct. 4, 2015].
(Continued)

*Primary Examiner* — Melvin C Marcelo
(74) *Attorney, Agent, or Firm* — Klarquist Sparkman, LLP

(57) ABSTRACT

A method of operating a radio receiver to receive downlink control information from a wireless network over a physical downlink control channel, said method comprising receiving a plurality of downlink control information prospect signals; decoding at least one of said prospect signals to produce a prospect sequence; reading a declared repetition level from said prospect sequence; comparing said declared repetition level with a repetition level specified in a predetermined format hypothesis for said downlink control information to determine whether a match exists; if said match exists,
(Continued)

storing at least part of said prospect sequence as a prospect stored portion; and subsequently deriving said downlink control information from a prospect stored portion and using said downlink control information in further communications.

19 Claims, 6 Drawing Sheets

(56) References Cited

U.S. PATENT DOCUMENTS

2017/0118792 A1* 4/2017 Rico Alvarino .. H04W 52/0225
2018/0375623 A1* 12/2018 Suzuki .................. H04L 1/1812
2020/0100223 A1* 3/2020 Park .......................... H04L 5/10

OTHER PUBLICATIONS

International Search Report and Written Opinion for PCT/EP2019/066366, dated Sep. 3, 2019, 20 pages.
IPO Search Report under Section 17(5) for GB18107, dated Dec. 11, 2018, 4 pages.

* cited by examiner

RADIO DOWNLINK INFORMATION

CROSS REFERENCE TO RELATED APPLICATIONS

This is the U.S. National Stage of International Application No. PCT/EP2019/066366, filed Jun. 20, 2019, which was published in English under PCT Article 21(2), which in turn claims the benefit of Great Britain Application No. 1810771.4, filed Jun. 29, 2018.

TECHNICAL FIELD

The present invention relates to the acquisition of downlink control information (DCI) sent over a physical channel of a radio network such as a Long Term Evolution (LTE) network.

BACKGROUND

Throughout the course of recent years, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol. The air interface of LTE is often referred to as Evolved UMTS Terrestrial Radio Access (or "E-UTRA").

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices.

These smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth to be shared between user equipment (UE) that accesses the network in a given cell, provided by a base station, referred to in LTE as an "enhanced node B", "eNodeB", or simply "eNB". OFDMA is a multi-user variant of orthogonal frequency division multiplexing (OFDM), a multiplexing scheme known in the art per se.

At the physical layer, in the downlink of an LTE connection, each data frame is 10 ms long and is constructed from ten sub-frames, each of 1 ms duration. Each sub-frame contains two slots of equal length, i.e. two 0.5 ms slots. Each slot (and by extension, each sub-frame and each frame) will typically contain a certain number of "resource blocks" (where each sub-frame has twice as many resource-blocks as a slot and each frame has ten times as many resource blocks as a sub-frame). A resource block is 0.5 ms long in the time domain and is twelve sub-carriers wide in the frequency domain. Generally speaking, there are seven OFDM symbols per slot and thus fourteen OFDM symbols per sub-frame. These resource blocks can be visualised as a grid of "resource elements", where each resource element is $\frac{1}{14}$ ms long and one sub-carrier wide, such that there are eighty-four resource elements per resource block (i.e. seven multiplied by twelve) and one hundred and sixty-eight resource elements per sub-frame.

A downlink control channel between the eNB and the UE is used for setting up transmission or reception links (up-links/downlinks) using appropriate control signalling between the UE and the eNB. This is achieved by transmission of "Downlink Control Information" (DCI) from the eNB to the UE. The DCI provides information on the resources that are to be allocated for a particular downlink or uplink channel such as the resource blocks and subframes as well as the modulation and coding schemes that are to be used by the downlink/uplink channel.

The DCI is transmitted over a control channel such as the Physical Downlink Control Channel (PDCCH), Enhanced Physical Downlink Control Channel (EPDCCH), MTC Physical Downlink Control Channel (MPDCCH) or Narrowband Physical Downlink Control Channel (NPDCCH). Since the DCI is required in order to set up the downlink channel, prior to its proper reception the UE does not know if or when information intended for it is being transmitted. The UE therefore carries out a process of "blind decoding" whereby it tries to decode different combinations of resource elements in all of the radio transmissions it receives to ascertain whether any of them represent the transmission of valid DCI. In order to make a determination as to whether a particular decoded bit-stream represents the required DCI, the UE compares what would be the DCI payload of the bitstream if it is a genuine DCI transmission with what would be the cyclic redundancy check (CRC) value, calculated according to a predetermined algorithm suffixed to the DCI payload. If the CRC matches the payload, the sequence is treated as having been successfully decoded and then used to set up the downlink channel for further transmissions.

Typically a UE will receive multiple downlink control information payloads via the downlink control channel, each payload being intended for a specific UE or group of UEs. Before they are decoded however, the UE does not know which DCI is actually intended for it. Various techniques are employed in order to resolve this. For example a modification may be made to the CRC such that a 'mask' is applied to it in the form of a Radio Network Temporary Identifier (RNTI), unique to a particular UE or group of UEs. This means that only the intended UE(s) will determine a successful CRC match, even if other UEs receive the information accurately. In addition to this UE specific search spaces of E/M/NPDCCH have UE specific scrambling sequences and demodulation reference signals. Additionally, UE specific search spaces of all the xPDCCH channels use a method where only a limited group of decoding candidates are actually decoded by a group of UE's (with a specific value of C-RNTI, or Cell RNTI, for each kind of PDCCH channel).

One of the downsides of the blind decoding approach is that there is a tendency to produce a high number of false positives. Most blind decoding attempts produce random bit sequences due to (a) the presence of mostly random noise and interference, especially on the unallocated parts of the physical control channel; and (b) the scrambling of encoded DCI's which ensures that decoding is only possible when using exactly the correct parameters. However, if a UE performs a high number of blind decoding attempts, the probability of a random sequence meeting the CRC check becomes significant. For example, the probability of a random sequence meeting a 16 bit CRC is $\frac{1}{2}^{16}$. However if a UE is monitoring an empty control channel with 6 physical resource blocks (of 1 ms duration) for one minute, 360,000 blind decoding attempts will be carried out. Statistically, by assuming a binomial distribution for the probability of false positives, this corresponds to 5.4 false positives per minute.

Release 13 of the LTE standard introduced coverage enhancement for 'Bandwidth Reduced Low Complexity' (BL) and 'Coverage Enhancement' (CE) UEs by providing for repetition in physical downlink channels, in particular the physical downlink shared channel (PDSCH) and the MTC physical downlink control channel (MPDCCH).

The repetition of data on these channels is carried out across multiple sub-frames and is designed to provide an averaging gain when the signal power is low, i.e. when the signal-to-noise ratio (SNR) is low. There are two modes of coverage enhancement defined in the standard, 'Class A' and 'Class B'. Class A is a mandatory feature that defines a moderate number of repetitions while Class B is an optional feature that defines a higher number of repetitions. The maximum number of repetitions in Class A is 32 for PDSCH while the maximum number of repetitions in Class B is 2048 for PDSCH. The same data is sent across N consecutive sub-frames using the same LTE structure.

Similarly, in NB-IoT communications, the narrowband physical downlink shared channel (NPDSCH) may provide for a maximum of 2048 repetitions.

The actual number of repetitions N (e.g. of the PDSCH sub-frames) used is defined by the standard but is typically variable. The number of repetitions being used by the eNB is signalled in a downlink control indicator and is typically selected based on various channel quality metrics, known in the art per se, which will typically vary during operation.

The Applicant has recognised that in radio systems that use such repetition, the problem of false positives during DCI selection is exacerbated. This is because in schemes that use repetition, the repeated DCIs also produce false positives such that even if the correct DCI is decoded, the UE cannot tell which is the correct one. The computational cost of selecting the wrong DCI is high, especially in the context of long repetitions. For example up to 2048 ms of wasted processing may be carried out if the wrong DCI is incorrectly used.

Whilst it is known to examine the binary content of DCI to check for invalid parameters or to use different kinds of metrics from a Viterbi decoder to detect errors these approaches do not offer a solution to the repetition problem set out above.

SUMMARY OF THE INVENTION

When viewed from a first aspect, the present invention provides a method of operating a radio receiver to receive downlink control information from a wireless network over a physical downlink control channel, said method comprising:

receiving a plurality of downlink control information prospect signals;

decoding at least one of said prospect signals to produce a prospect sequence;

reading a declared repetition level from said prospect sequence;

comparing said declared repetition level with a repetition level specified in a predetermined format hypothesis for said downlink control information to determine whether a match exists;

if said match exists, storing at least part of said prospect sequence as a prospect stored portion; and subsequently deriving said downlink control information from a prospect stored portion and using said downlink control information in further communications.

When viewed from a second aspect, the present invention provides a radio receiver device arranged to perform the steps of the method as described above.

Thus, it will be seen by those skilled in the art that in accordance with at least embodiments of the invention, a radio receiver receives signals which may contain DCI and attempts to decode them—preferably by looking for bit sequences which meet a cyclic redundancy check (CRC). Preferably the CRC is at least partially targeted at the radio receiver—e.g. it is a 'masked' CRC where the 'mask' may be an RNTI value, as previously described. Since the decoding is carried out 'blind', random sequences may accidentally pass the CRC ('false positives') with reasonable statistical regularity. However by comparing what such a sequence would indicate as being the repetition level with which it is being transmitted (i.e. the declared repetition level) with the specified repetition level it would have if it met the predetermined format hypothesis, a greater level of certainty can be achieved that the prospect sequence in fact contains the correct downlink control information for the radio receiver in accordance with the predetermined format hypothesis. This can therefore help to reduce the number of false positives which would otherwise arise from relying on the CRC alone.

As will be understood by those skilled in the art, the repetition level of a signal is the number of times the signal is repeated during a predetermined period of time ('repetition period'), after which it may or may not be re-transmitted.

As the radio receiver does not know exactly what format the DCI will take, it will typically formulate a number of 'guesses' in the form of predetermined format hypotheses. These may each comprise a number of different parameters such as the resource elements used, as well as the specified repetition level. The radio receiver may be arranged to monitor for a plurality of predetermined format hypotheses at any time—i.e. a received prospect signal may be tested against each of a plurality of such hypotheses. Monitoring for the plurality of hypotheses could take place sequentially, but preferably takes place simultaneously.

If the declared repetition level of the prospect sequence does not match the specified repetition level for a given hypothesis, the prospect sequence may be disregarded from further consideration in respect of that hypothesis. Doing this for the or each hypothesis ultimately helps to ensure that false positives are rejected and so avoids the receiver wasting time and power on trying to set up an uplink or downlink based on falsely assuming that the prospect sequence contained the correct downlink control information. On the other hand, prospect sequences that have the correct repetition level are kept for future processing, and could be eventually be selected as a chosen sequence for providing DCI used to set up a connection. The stored prospect portion may be associated with the predefined format hypothesis in which the matched repetition level was specified. Typically the stored prospect portion is associated with only a single predefined format hypothesis but there may be circumstances in which the stored prospect portion is associated with multiple predefined format hypotheses in which the matched repetition level was specified.

Although the repetition level check could be selective enough to reduce the number of false positives to an acceptably low level, in a set of embodiments, a check is performed to determine whether the prospect sequence has valid content. This could, for example, comprise application of a rule that particular parameters implied by the prospect sequence being assumed to represent downlink control information are invalid or not allowed in specific situations, as is known per se in the art. Additionally or alternatively, certain bits of the prospect sequence could be checked against specified values (e.g. 0) for those bits. The validity check is typically specific to a particular predetermined format hypothesis. For example different formats may contain different fields and different amount of bit padding. Some examples of DCI formats are the formats referred to as "6-1A" and "6-0A". DCI format 6-1A is typically used for downlink channel allocation while 6-0A is typically used for uplink channel allocation. DCI formats 6-1A and 6-0A have the same size, share the same search spaces and RNTI's. They are distinguished by the first bit of the payload, with 0 indicating 6-0A and 1 indicating 6-1A.

The validity check could be carried out before or after the repetition level match determination. If the prospect sequence portion is determined to have invalid content it may be disregarded, e.g. by not being stored as a prospect stored portion, at least for a given predetermined format hypothesis against which it is being checked.

In some implementations the radio receiver could begin to attempt decoding of prospect signals only after enough have been received to correspond to all of the repetitions expected for a given predefined hypothesis format. These repetitions can then combined in order to average out noise and then decoded once. Alternatively decoding could be based on a fewer number of repetitions (or a single instance) in which case decoding can begin earlier and it may be possible to stop decoding earlier as explained further hereinbelow. The invention may be applicable to any of these approaches.

If a prospect sequence passes the repetition level check and optionally the content validity check, it could be adopted immediately in order to provide the DCI. However the Applicant has recognised that this might still give rise to too high a risk of adopting the wrong DCI and thus in a set of embodiments the receiver continues decoding of prospect signals until at least the end of a period corresponding to a shortest number of said declared repetitions from the prospect sequences have been received. Thus, for example, if one prospect sequence declared a repetition level of 8 and another declared a repetition level of 4, the receiver would continue decoding until 4 repetitions of the prospect signal should have been received (of course it is not known at this stage in fact whether a signal is being repeated or was simply a false positive). This recognises and allows for the possibility of receiving multiple potential DCIs which have valid content but which conflict in respect of the resources they represent—e.g. colliding receive and transmit operations in the same sub-frame.

In a set of embodiments, the receiver stores timestamps associated with any prospect stored portions. In a set of embodiments if there is more than one prospect stored portion, the receiver selects one or more prospect stored portions having the latest timestamp(s). This is considered to be potentially advantageous since the prospect with the latest timestamp is likely to have been decoded furthest into its repetition period which means that it will tend to have the highest signal-to-noise ratio since it will combine the highest number of repetitions compared to those decoded less far into their repetition period.

If there is only one prospect stored portion selected by considering the latest timestamp(s), it may then be used to derive the DCI. If, however there are two or more stored prospect portions selected (either through having the same timestamp or by deliberately selecting multiple stored prospect portions with relatively later timestamps rather than just one with the latest timestamp) which represent conflicting DCIs, or if the aforementioned timestamp comparison step is not employed, the receiver may, in a set of embodiments, select a stored prospect portion having a greatest information content metric. This may therefore select the prospect which represents the greatest amount of information and so be most likely to be accurate. For example the information content metric could be based on the aggregation level, L, which corresponds to the number of control channel elements (CCE's) that have been aggregated together in a control channel. The size of a CCE depends on which type of control channel is being used (PDCCH/EPDCCH/MPDCCH/NPDCCH). For E/MPDCCH an ECCE (Enhanced CCE) consists of an equivalent of ¼th of the resource elements of a resource block, excluding the PDCCH part of the subframe, and assuming use of a normal cyclic prefix and a normal subframe. In these examples, L can have values between 1-24. In one example the information content metric comprises $L*R_{CURRENT}$, wherein L is the aggregation level and $R_{CURRENT}$ is the number of repetitions of the prospect stored portion so far.

In a set of embodiments, if a second prospect sequence arising from a later transmission represents the same DCI as a previously-stored prospect stored portion and is associated with the same predetermined format hypothesis as said previously-stored prospect stored portion, and there are no other prospect stored portions representing conflicting DCIs associated with other predetermined format hypotheses, the DCI represented by the second prospect sequence (and the prospect stored portion) may be used as the DCI for subsequent communications without decoding any further prospect signals during the repetition period of the second prospect sequence. In other words the process of decoding repetitions may be stopped early (before all repetitions have been received) in this circumstance given that it can be considered to correspond to a high probability of the DCI being correct. This tends to save power by reducing the amount of processing necessary.

The second prospect sequence may correspond to decoding the prospect signal transmitted immediately after the prospect signal which gave rise to the prospect stored portion; in other words they may relate to successive successful attempts to decode a repetition of a prospect signal indicating the same DCI.

In a set of embodiments, if the receiver is unable to decode a first prospect signal (e.g. because it fails a CRC) and is subsequently unable to decode a second prospect signal arising from a later transmission corresponding to a supposed repetition of said first prospect signal (i.e. transmitted during the same repetition period) the receiver discards any previously decoded prospect sequences corresponding to supposed earlier repetitions (transmissions made earlier in the repetition period). The Applicant has appreciated that these can be discarded as they can be assumed to be the result of false positives.

In a preferred set of embodiments, the radio receiver is an LTE radio receiver and the LTE radio receiver receives the radio signal from an eNB base station of an LTE network. In a set of embodiments the receiver is configured to support NB-IoT communication.

BRIEF DESCRIPTION OF DRAWINGS

Certain preferred embodiments of the invention will now be described, by way of example only, with reference to the accompanying drawings, in which.

DETAILED DESCRIPTION

Figure 1:
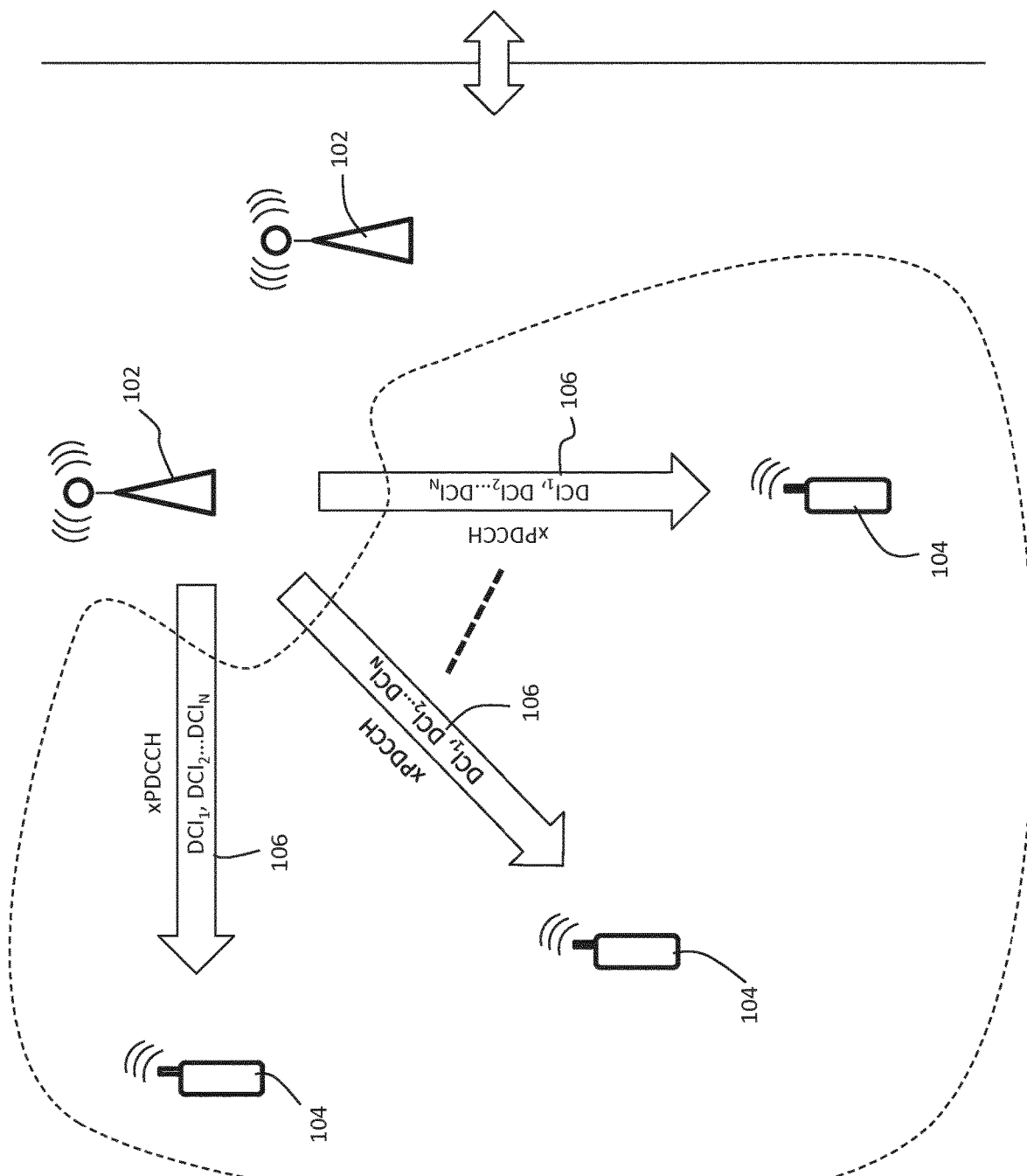
FIG. 1 illustrates a typical radio network, radio signals and radio receivers to which embodiments of the invention may be applied.

FIG. 1 shows a typical radio network 100 comprising base stations 102 and user equipment (UE) 104 such as Internet of Things (IoT) devices wherein each UE 104 comprises a radio receiver for accessing the radio network 100. The rest of the network is not shown in detail. For example, the base stations 102 may correspond to the eNodeBs (eNBs) of a Long Term Evolution (LTE) network.

To set up communications between a base station 102 and a UE 104, a downlink channel and an uplink channel must be established. The downlink channel conveys data from the base station 102 to the UE 104 while the uplink channel conveys data from the UE 104 to the base station 102

To establish a downlink channel, the base station 102 typically sends to the UE 104 Downlink Control Information (DCI) that may, for example, contain information for the UE 104 regarding the communication resources that are to be used by the downlink or uplink channel. Resources may include frequency slots and/or time slots in an OFDM scheme.

Typically, the base stations 102 each broadcast 106 a plurality of Downlink Control Information (DCI) payloads, on a Physical Downlink Control Channel (xPDCCH) channel, where the 'x' designates that there are a number of different control channel types which could be used. The xPDCCH is a channel over which the DCI is sent.

Each DCI is intended for a particular UE or group of UEs. A DCI may be intended for a group of UEs if, for example, a paging DCI is sent with P-RNTI to all UE's in the same paging group. In this case, differentiation happens only when the UE's receive the PDSCH payload and decode it at higher protocol layers. Each UE 104 will typically receive a number of DCIs— including those intended for it and others not intended for it. Each UE must therefore select the correct DCI from the plurality of DCIs that it receives from the base station 102.

An embodiment of the present invention will now be described in relation to FIGS. 2A, 2B and 3. In this embodiment it is assumed that control channel repetition is employed (e.g. as in NB-IoT) so that the messages containing the DCI are repeated a certain number of times in order to enhance the probability that they can be successfully received and decoded even under low SNR conditions such as where the UE is a long way from the ENodeB 102.

In view of the repeated signals on the control channel and consequent heightened risk of false positives when applying just a CRC check, the described embodiment employs a more sophisticated approach to the UE 104 selecting the correct DCI.

The UE 104 generates a number of predefined format hypotheses, or guesses, at the format that the signal containing the DCI will take and referred to hereinafter as 'DCI candidates'. A typical (and maximum) number of candidates is 20 for MPDCCH (category M1) and 4 for NPDCCH (category NB1). EPDCCH and PDCCH have higher numbers since they are intended for higher specification UE's.

One parameter which makes up such a DCI candidate is the repetition level, R, which is the number of times the signal containing the DCI will be repeated. Other parameters include the start offset, the set of physical resource blocks (PRBs) used, the aggregation level, L, and the search space. The search space may comprise a number of different 3GPP parameters such as the specific control channel resource allocation, mode of the UE (random access/paging reception/connected mode), narrowband, DCI type and RNTI values that is searched for etc. In general terms, the search space may be defined as the set of control channel resources a UE monitors in a specific situation. The DCI parameters may also include the DCI block size and the UE Radio Network Temporary Identifier (RNTI) value associated with the particular UE.

Over a period of time corresponding to the search space referred to above the UE receives (via it's RF front end and analogue portion) signals representing a number of LTE subframes—e.g. sixteen. These could be consecutive but are often not—for example if the UE is configured with a bitmap of valid subframes there may be many invalid subframes between them. The signal received in a given sub-frame will be referred to as a 'prospect signal'.

Figure 2A:
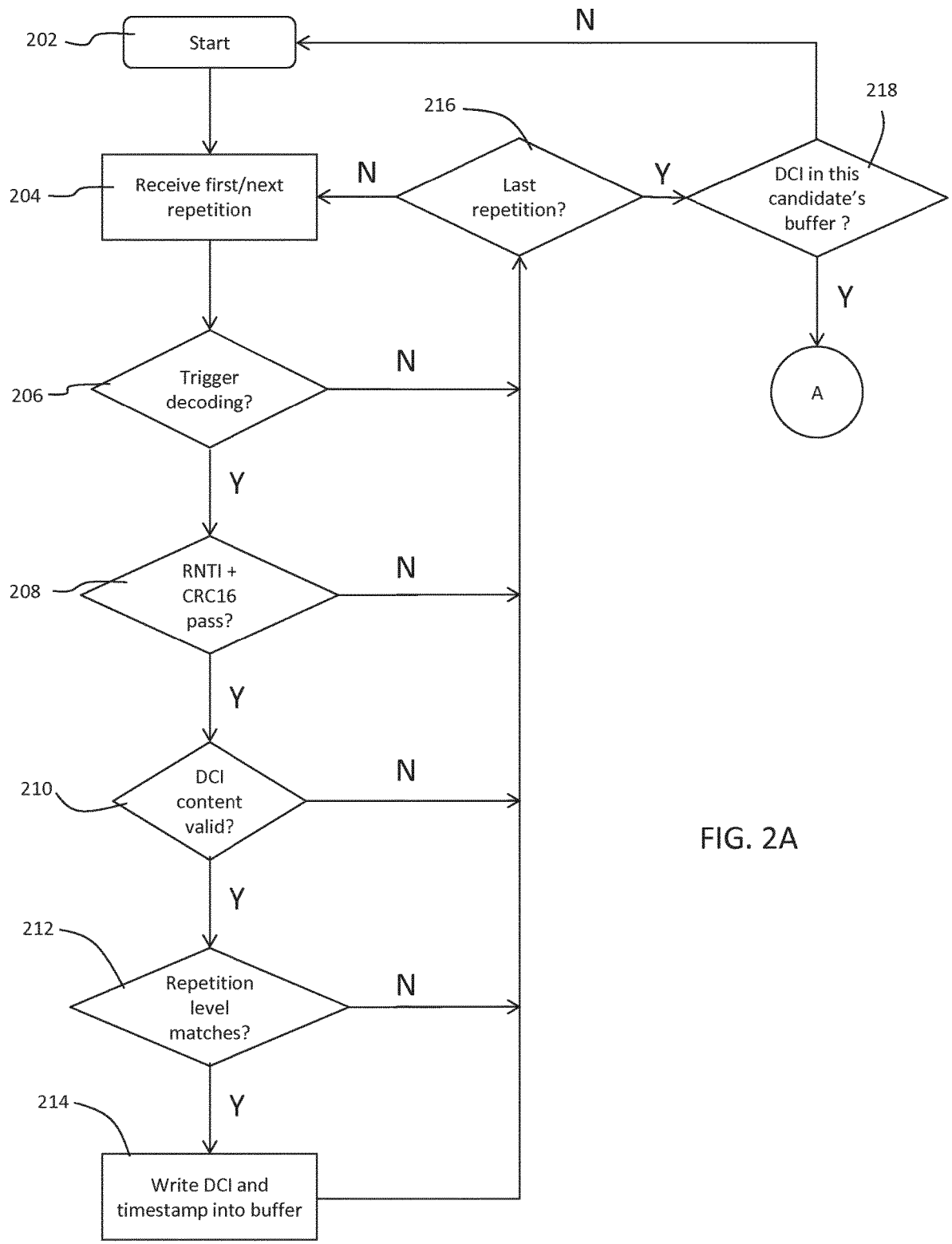
FIGS. 2A and 2B comprise connected flowcharts illustrating a method in accordance with an embodiment of the present invention.
Figure 2B:
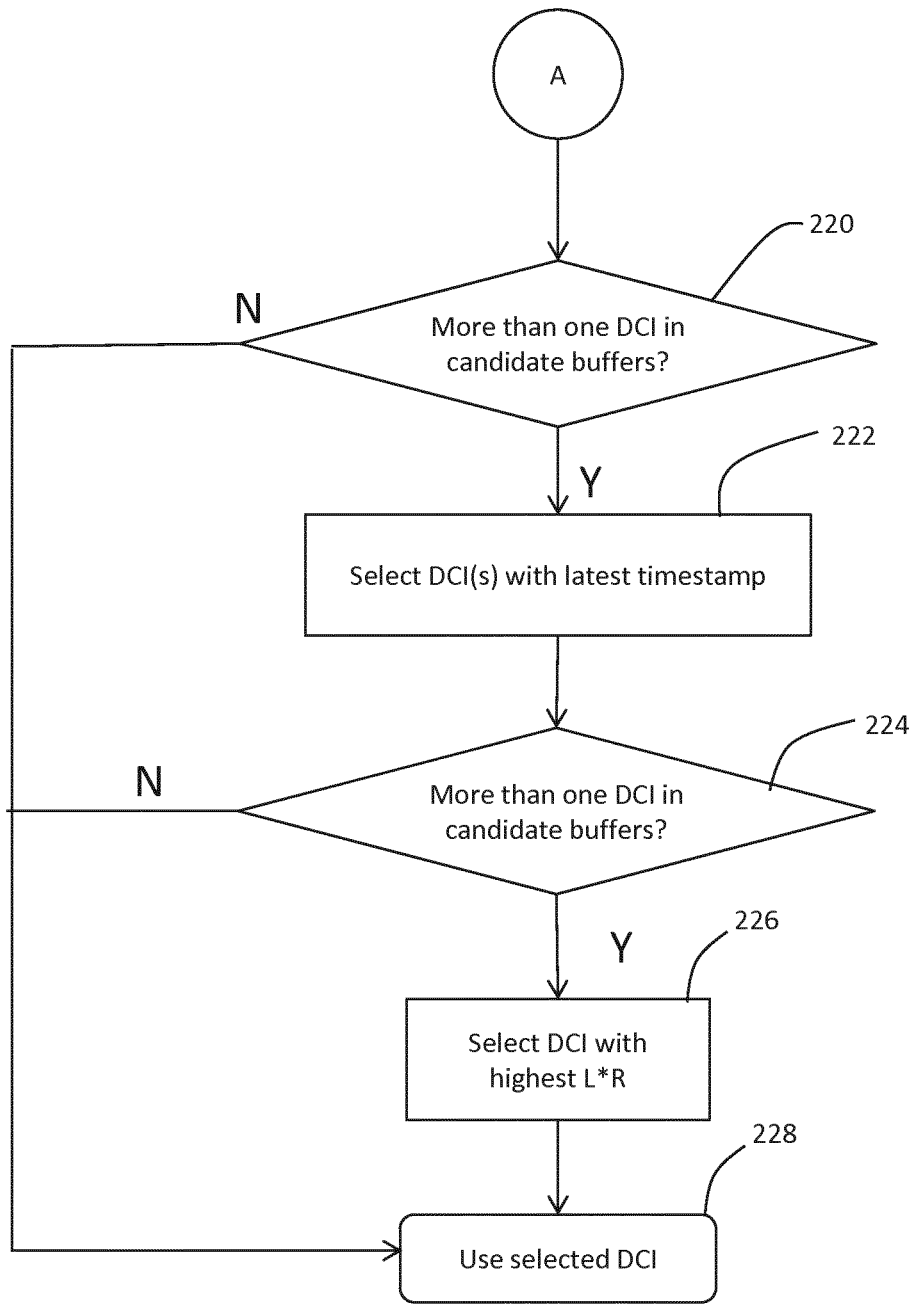

FIG. 2A illustrates a method carried out on each of these prospect signals in turn and in parallel for each DCI candidate. The method starts at step 202 and at step 204, a first prospect signal is received. This may also be thought of as the first repetition of the prospect signal. In subsequent iterations of the method shown in FIG. 2, this may be combined with prospect signals from earlier sub-frames in order to enhance the SNR of the aggregate signal as is known per se in the art.

At step 206, a determination is made as to whether to trigger decoding. The UE may be set up to decode each repetition (i.e. each sub-frame) as it is received or could wait until more (or indeed all) of the expected repetitions have been received based on the repetition level R of the DCI candidate being monitored (as mentioned the method described here is carried out in parallel in respect of each DCI candidate). If decoding has not been triggered, the UE determines at step 216 whether the present repetition is the last and if not, continues to receive the next. The steps taken if the present repetition is the last, are described further below.

If decoding has been triggered, the decoding circuitry in the UE attempts to turn the prospect signal into a series of bits using 'blind decoding' i.e. without knowing the format of the signals. The resultant sequence ('prospect sequence') is then subjected at step 208 to a determination as to whether the decoding was successful. This is done by applying a cyclic redundancy check (CRC). A CRC checksum may be generated in the transmitter by performing a function on the DCI payload, for example polynomial division to give, say a sixteen bit number. This may then be encoded by the RNTI and then appended to the payload. At step 108 the UE uses the RNTI specified in the DCI candidate (although the same for all DCI candidates as it relates to the UE as a whole) to "unmask" the CRC checksum. It then performs, for example, the polynomial division on the presumed DCI payload portion and compares the result with the supposed CRC checksum. The prospect sequence passes CRC, i.e. the decoding is deemed successful, if the checksum generated by the polynomial division matches the received checksum. If decoding is unsuccessful the prospect sequence is disregarded as far as this particular DCI candidate is concerned, and the method reverts via step 216 to the next remaining repetition from the next sub-frame, if any.

Assuming the sequence has been successfully decoded, then at step 210, a check is made as to whether the DCI content of the sequence is valid. This might comprise one or more DCI content validity checks of a type known per se in the art such as application of a rule that particular parameters implied by the prospect sequence being assumed to represent downlink control information are invalid or not allowed in specific situations, as is known per se in the art. Additionally or alternatively, certain bits of the candidate sequence could be checked against specified values (e.g. 0) for those bits. The content check could be specific to the particular DCI candidate being monitored. If the content is found to be invalid, the prospect sequence is disregarded as far as this particular DCI candidate is concerned, and the method reverts via step 216 to the next remaining repetition from the next sub-frame, if any.

At step 212, the repetition level declared in the DCI represented by the prospect sequence is compared with the repetition level, R, of the DCI candidate. This step is considered to be particularly advantageous in filtering out false positive random sequences which have erroneously passed the CRC check at step 208. If the repetition levels do not match, the prospect sequence is disregarded as far as this particular DCI candidate is concerned, and the method reverts via step 216 to the next remaining repetition from the next sub-frame, if any.

If the repetition levels match, then the DCI within the prospect sequence is written at step 214 into a buffer associated with the DCI candidate (as a 'prospect stored portion') along with a timestamp—i.e. the timeslot associated with the sub-frame from which the prospect sequence came. If there is already a DCI in the buffer from an earlier repetition, it is overwritten, giving automatic precedence to the later-received DCI for that DCI candidate (i.e. the one obtained after a greater number of repetitions which should have better SNR). A check is then made at step 216 as to whether there are any repetitions remaining. If there are, the method is repeated from step 204 on the next prospect signal repetition.

Once all repetitions have been processed in the manner described above, a check is made at step 218 to see whether any DCI has been stored in the buffer of this particular DCI candidate. If so, processing continues according to the flow chart shown in FIG. 2B.

As mentioned above the method shown in FIG. 2B is carried out for each of the DCI candidates. As the different DCI candidates will, in general, have different repetition levels, the amount of time taken to process all repetitions will vary between the DCI candidates. The UE stops decoding repetitions once the shortest repetition period has elapsed. This is because the scheduling of the transmitter or receiver operation is fixed to be a certain number of sub-frames after the repetition period of the DCI has ended. For example, in MPDCCH, the scheduling of the transmitter or receiver operation is fixed to be +4 or +2 (respectively) subframes after the repetition period of the DCI has ended. So the UE has to act when it has found one or more DCI's and when the shortest repetition period of those DCIs ends. The subsequent operation of the UE is illustrated in FIG. 2B.

At step 220 the UE determines whether DCI is recorded in the buffers of more than one of the DCI candidates. Having multiple recorded DCIs typically Indicates that they are in conflict with one another—e.g. indicating colliding transmission and receive operations through overlapping resource blocks. However, this is not always the case. Either way, the presence of a scheduling conflict is checked If only one DCI is stored in the candidate buffers it may be immediately selected and used at step 228 to set up the required uplink or downlink channel to enable subsequent communications between the UE and the EnB. However if there are multiple, conflicting DCIs stored, a comparison is made at step 222 between them to determine which of them has the latest timestamp stored with them and to select it/them. As explained above in the context of an individual DCI candidate, DCIs with later timestamps are likely to be more accurate as more repetitions thereof have been received. The remaining DCIs may be discarded, e.g. by clearing the associated buffers.

At step 224 another determination is made as to whether two or more of the DCIs remain after step 222. If so, a selection is made at step 226 of the DCI which has the greatest information content—e.g. by considering the value of $L*R_{CURRENT}$ where L is the aggregation level of the corresponding DCI and $R_{CURRENT}$ is the number of repetitions of the DCI which have been received so far. The DCI with the greatest value of $L*R_{CURRENT}$ combines the most information relative to the other DCI(s).

Once a DCI is chosen, it is used by the radio receiver at step 228 to setup a downlink or uplink channel between the radio receiver and the eNB. In particular, the chosen DCI informs the radio receiver of the resources that are to be allocated to the radio receiver for subsequent communications.

In accordance with the embodiment described, the incidence of false positives in selecting a DCI may be dramatically reduced. In particular, even if a false positive is produced at the RNTI/CRC stage, it is likely to be discarded during the remaining checks. This is advantageous as the computational cost of selecting a DCI that is a false positive is high. This is especially true of schemes that use repetition because repetitions can be, for example, up to 2048 ms long, making an erroneous DCI selection computationally expensive. Reducing false positives can thus save time and power.

Depending on the application and required performance, it is not essential that all checks are carried out. For example it is envisaged that the content validity check at step 210 could be omitted.

Figure 3:
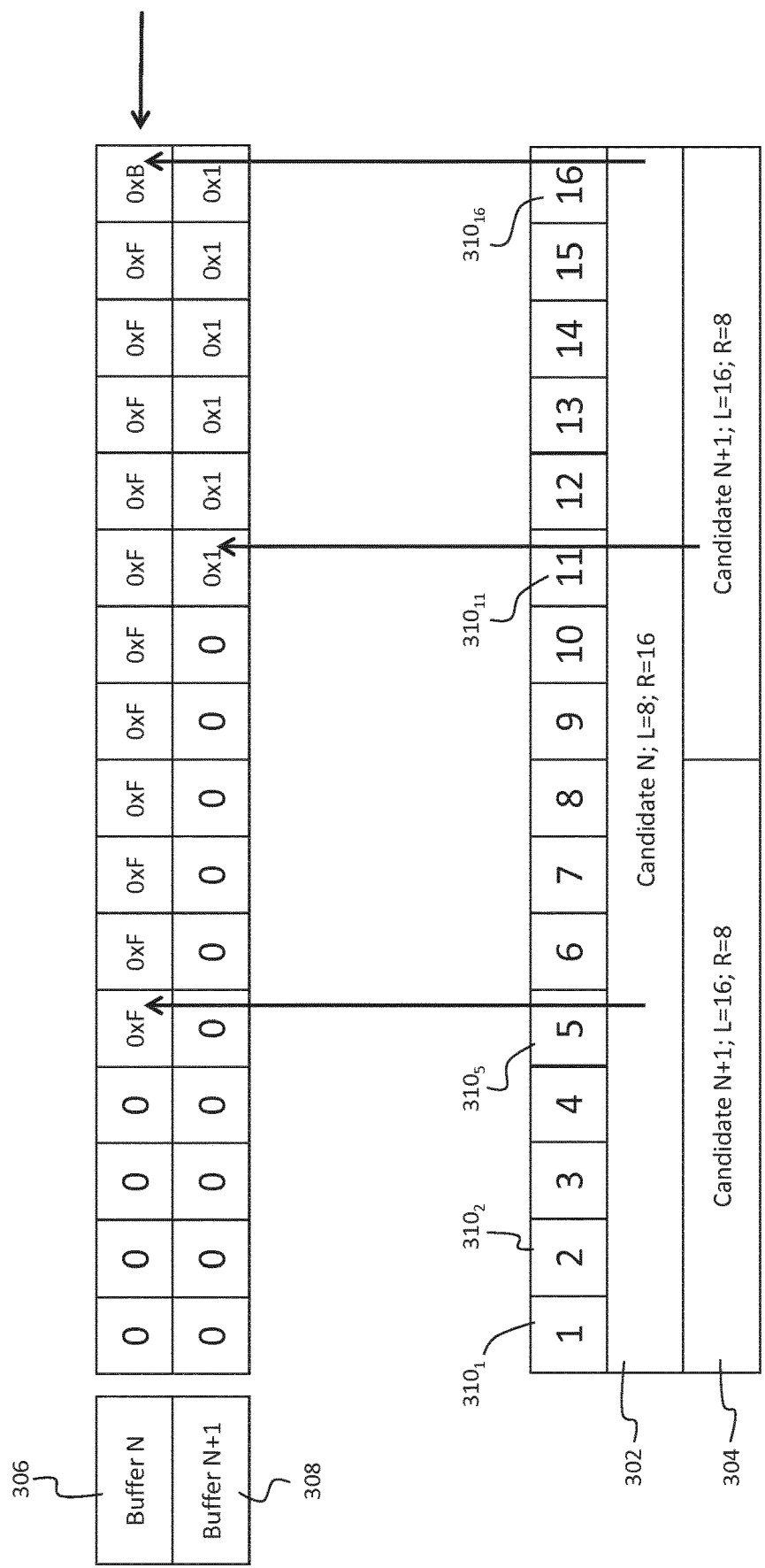
FIG. 3 illustrates a simplified example of the application of the method of FIGS. 2A and 2B.

FIG. 3 gives a simplified illustration of the operation of the method described above with reference to FIGS. 2A and 2B. In this illustration two DCI candidates generated by the UE 302, 304 are shown. The first candidate 302 is the Nth DCI candidate and the second candidate 304 is the N+1th candidate, indicating that typically there would be more than the two shown. The second candidate 304 is shown twice for ease of illustration as will be apparent.

The first candidate 302 has a repetition level R of 16 whereas for the second candidate 304, R=8. The two candidates differ in other respects too, for example the first candidate 302, has an aggregation level L=8, whereas the second candidate 304 has an aggregation level L=16.

In the upper part of the diagram are shown two buffers 306, 308 corresponding to the two DCI candidates 302, 304 respectively which are initially empty. Immediately above the representations of the DCI candidates 302, 304 are depictions of a number of consecutive sub-frames $310_1$, $310_2$ etc.

In operation prospect signals are received in each of the consecutive sub-frames $310_1$, $310_2$ etc. These are assessed in parallel against the two respective DCI candidates 302, 304. In the first four sub-frames the prospect sequences derived from the signals fail the CRC, content validity or repetition level check in respect of both candidates 302, 304. However the sequence received in the fifth sub-frame $310_5$, after five repetitions for the first candidate 302 passes the CRC, the content validity and the repetition level check in respect of the first candidate 302 and thus its DCI payload 0xF is stored in the first candidate's buffer 306 along with a timestamp.

At least one of the checks is failed in respect of the sequences received in the sixth to tenth sub-frames in respect of both candidates 302, 304 but the sequence received in the eleventh sub-frame $310_{11}$, after three repetitions for the second candidate 304 passes the CRC, the content validity and the repetition level check in respect of the second candidate 304 and thus its DCI payload 0x1 is stored in the second candidate's buffer 308 along with a timestamp. The two DCIs in the respective buffers 306, 308 conflict with one another.

At least one of the checks is failed in respect of the sequences received in the twelfth to fifteenth sub-frames in respect of both candidates 302, 304 but the sequence received in the sixteenth sub-frame $310_{16}$, after sixteen repetitions for the first candidate 302 passes the CRC, the content validity and the repetition level check in respect of the first candidate 304 and thus its different DCI payload 0xB is stored in the second candidate's buffer 308 along with a timestamp. Again the two DCIs in the respective buffers 306, 308 conflict with one another.

Now that all the repetitions have been received and there are conflicting DCIs in the buffers (cf step 220 of FIG. 2B) one of the DCIs is selected. In this case the payload 0xB in the first buffer 306 has the latest timestamp and so is selected for use. It is therefore not necessary to carry out the $L*R_{CURRENT}$ check although that would have yielded the same result.

Figure 4:
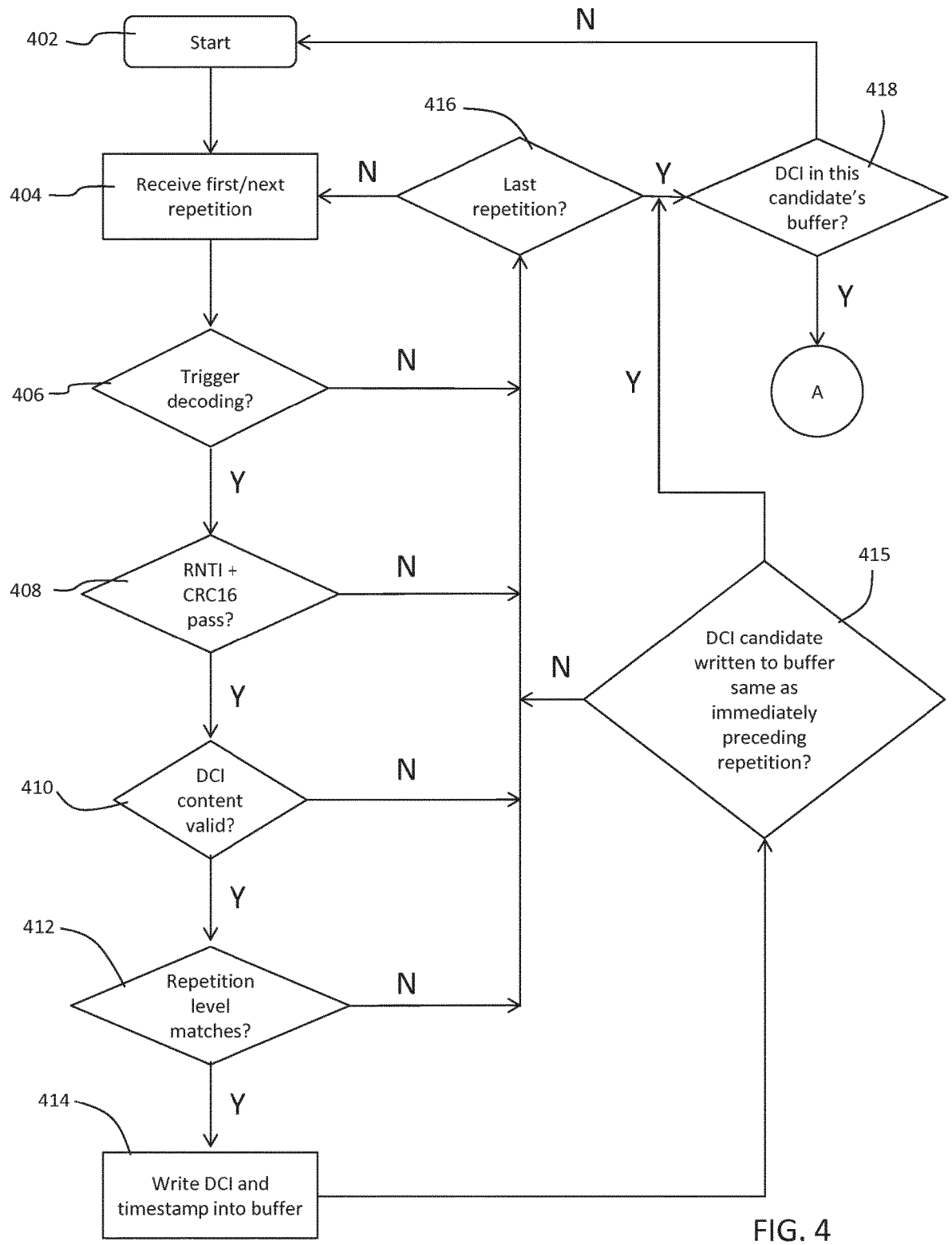
FIG. 4 is a flowchart illustrating an optional method of selecting a correct DCI early in accordance with another embodiment.

FIG. 4 is a flowchart illustrating a modified method in accordance with another embodiment of the invention. This is similar to the embodiment described above with reference to FIG. 2, and similar reference numerals are used where appropriate, except that after the step 414 of writing the DCI and timestamp to the buffer, an extra check is made at step 415 as to whether the DCI payload stored to the buffer is the same as for the immediately preceding repetition (i.e. the new payload being written to the buffer is compared to what was already in there prior to overwriting it and the timestamp is compared to the current timestamp). If so, rather than continuing to decode the rest of the repetitions, the method moves straight to step 418 where the stored DCI is treated as finalised for that DCI candidate such that the comparisons with other DCI candidates in FIG. 2B can take place. This reflects the appreciation that successive successful decoding of the same DCI is highly likely to indicate that it is correct. This modification can save power in such circumstances by avoiding unnecessary decoding.

Figure 5:
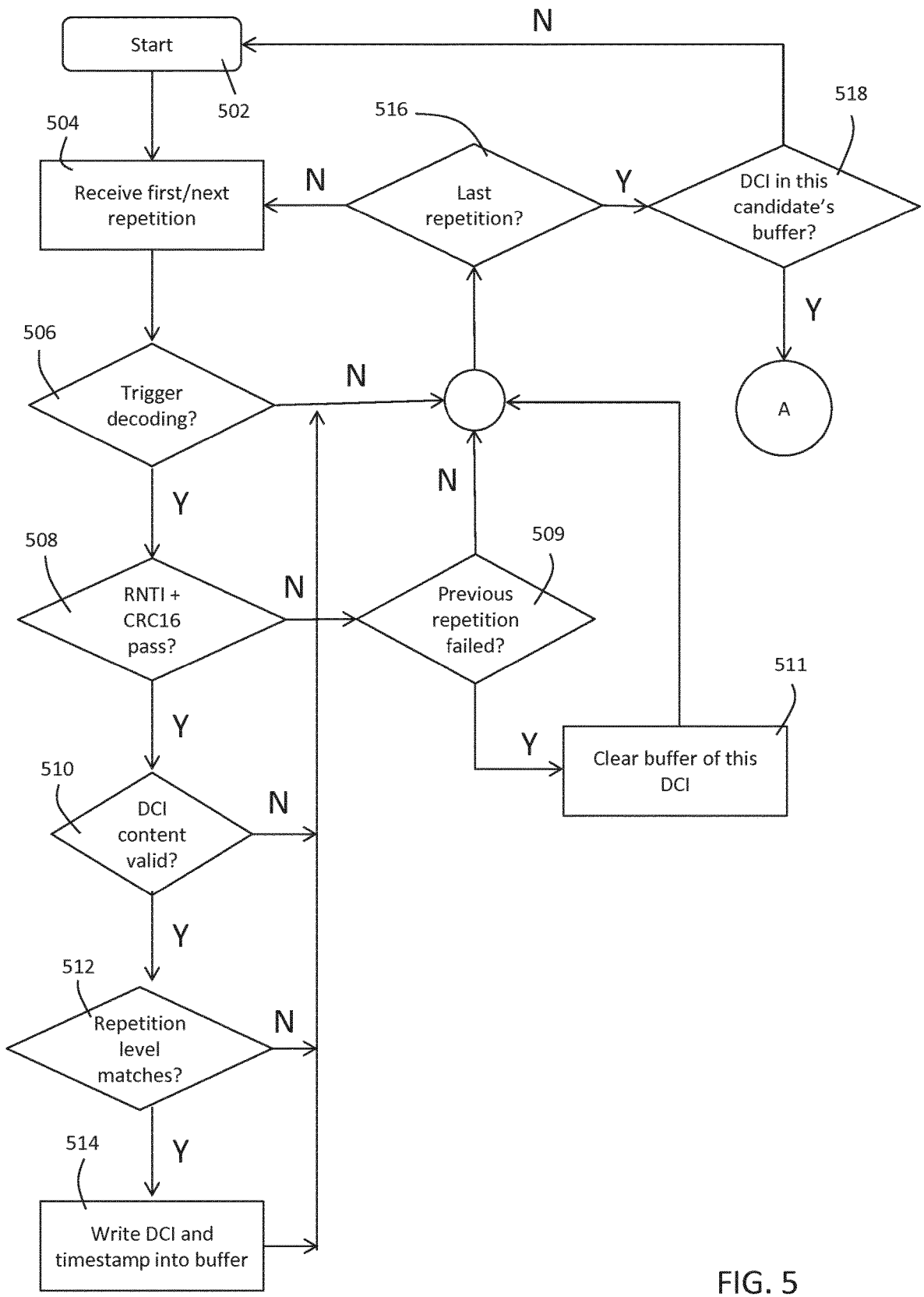
FIG. 5 is a flowchart illustrating an optional method in accordance with another embodiment.

FIG. 5 is a flowchart illustrating another modified method in accordance with another embodiment of the invention which can be used independently of or together with the modification shown in FIG. 4. Again, this is similar to the embodiment described above with reference to FIG. 2, and similar reference numerals are used where appropriate, except that after the step 508 of carrying out the CRC, if the prospect sequence fails, an additional check 509 is carried out as to whether the previous repetition also failed. If not, the method can continue to step 516 as previously described, but if the previous repetition did fail the CRC, the prospect sequence can be treated as very unlikely to be correct and the buffer cleared at step 511 on the assumption that any previous successful decoding must have been a false positive. Further decoding of the rest of the repetitions of the prospect signal is then continued by moving to step 516. This modification can further act to prevent false positives being used.

Those skilled in the art will appreciate that the specific embodiments described herein are merely exemplary and that many variants within the scope of the invention are envisaged.

The invention claimed is:

1. A method of operating a radio receiver to receive downlink control information from a wireless network over a physical downlink control channel, said method comprising:
   receiving a plurality of downlink control information prospect signals;
   decoding at least one of said prospect signals to produce a prospect sequence;
   reading a declared repetition level from said prospect sequence;
   comparing said declared repetition level with a repetition level specified in a predetermined format hypothesis for said downlink control information to determine whether a match exists;
   if said match exists, storing at least part of said prospect sequence as a prospect stored portion;
   selecting a stored prospect portion having a greatest information content metric of the stored prospect portions; and
   subsequently deriving said downlink control information from the selected prospect stored portion and using said downlink control information in further communications.

2. The method of claim 1 wherein if the declared repetition level of the prospect sequence does not match the specified repetition level for a given hypothesis, the prospect sequence is not subject to further processing in respect of that hypothesis.

3. The method of claim 1 wherein said decoding comprises monitoring for bit sequences which meet a cyclic redundancy check.

4. The method of claim 3 wherein said cyclic redundancy check is at least partially targeted at the radio receiver.

5. The method of claim 1 comprising monitoring for a plurality of predetermined format hypotheses simultaneously.

6. The method of claim 1 wherein the stored prospect portion is associated with a predefined format hypothesis in which the matched repetition level is specified.

7. The method of claim 1 comprising performing a validity check to determine whether the prospect sequence has valid content.

8. The method of claim 7 wherein if the prospect sequence portion is determined to have invalid content it is disregarded at least for a given predetermined format hypothesis against which it has been checked.

9. The method of claim 1 comprising attempting decoding of prospect signals after fewer prospect signals have been received than all of the repetitions expected for a given predefined hypothesis format.

10. The method of claim 1 comprising continuing decoding of prospect signals until at least the end of a period corresponding to a shortest number of said declared repetitions from the prospect sequences that have been received.

11. The method of claim 1 comprising storing timestamps associated with prospect stored portions.

12. The method of claim 11 comprising selecting one or more prospect stored portions having the latest timestamp(s) if there is more than one prospect stored portion.

13. The method of claim 1 wherein the information content metric is based on an aggregation level of the physical downlink control channel.

14. The method of claim 1 comprising, if a second prospect sequence arising from a subsequent transmission represents the same downlink control information as a previously-stored prospect stored portion and is associated with the same predetermined format hypothesis as said previously-stored prospect stored portion, and there are no other prospect stored portions representing conflicting downlink control information associated with other predetermined format hypotheses, using the downlink control information represented by the second prospect sequence as the downlink control information for subsequent communications without decoding any further prospect signals during the repetition period of the second prospect sequence.

15. The method according to of claim 14 wherein the second prospect sequence corresponds to the prospect signal transmitted immediately after the prospect signal which gave rise to the previously-stored prospect stored portion.

16. The method according of claim 1 comprising, if the receiver is unable to decode a first prospect signal and is subsequently unable to decode a second prospect signal arising from a subsequent transmission corresponding to a supposed repetition of said first prospect signal, discarding any previously decoded prospect sequences corresponding to the supposed earlier repetitions.

17. A radio receiver device arranged to perform the steps of the method of claim 1.

18. The radio receiver according to of claim 17, wherein the radio receiver is an LTE radio receiver and the LTE radio receiver receives the radio signal from an eNB base station of an LTE network.

19. The radio receiver of claim 17 wherein the receiver is configured to support NB-IoT communication.

* * * * *